US012165054B2

(12) United States Patent
Hashimoto (10) Patent No.: US 12,165,054 B2
(45) Date of Patent: Dec. 10, 2024

(54) NEURAL NETWORK RANK OPTIMIZATION DEVICE AND OPTIMIZATION METHOD

(71) Applicant: NEC Corporation, Tokyo (JP)

(72) Inventor: Hiroshi Hashimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1178 days.

(21) Appl. No.: 16/963,377

(22) PCT Filed: Oct. 24, 2018

(86) PCT No.: PCT/JP2018/039428
§ 371 (c)(1),
(2) Date: Jul. 20, 2020

(87) PCT Pub. No.: WO2019/146189
PCT Pub. Date: Aug. 1, 2019

(65) Prior Publication Data
US 2021/0073633 A1    Mar. 11, 2021

(30) Foreign Application Priority Data
Jan. 29, 2018    (JP) ................. 2018-012449

(51) Int. Cl.
*G06N 3/08*    (2023.01)
*G06F 17/16*    (2006.01)
(Continued)

(52) U.S. Cl.
CPC ............... *G06N 3/08* (2013.01); *G06F 17/16* (2013.01); *G06N 3/04* (2013.01); *G06N 3/063* (2013.01)

(58) Field of Classification Search
CPC . G06N 3/04; G06N 3/063; G06N 3/08; G06F 17/16
See application file for complete search history.

(56) References Cited

U.S. PATENT DOCUMENTS

| 2014/0122586 | A1* | 5/2014 | Kao | ................. G06Q 50/01 709/204 |
| 2016/0013773 | A1* | 1/2016 | Dourbal | ................. G06F 17/16 708/209 |

(Continued)

FOREIGN PATENT DOCUMENTS

JP    2017-525038 A    8/2017

OTHER PUBLICATIONS

Zhou et al., "Fast Nonnegative Matrix/Tensor Factorization Based on Low-Rank Approximation," IEEE Transaction on Signal Processing, vol. 60, No. 6, Jun. 2012, pp. 2928-2940. (Year: 2012).*

(Continued)

*Primary Examiner* — Eric J. Bycer (57) ABSTRACT

A neural network rank optimization device includes tensor decomposition means 1 for performing tensor decomposition processing of tensor-decomposing a convolution filter included in a neural network for low rank approximation, and rank optimization means 2A for optimizing a rank used in the tensor decomposition means 1, wherein the rank optimization means includes evaluation amount calculation means 3 for calculating an evaluation amount representing the degree of the low rank approximation, and rank determination means 4 for determining a rank corresponding to the evaluation amount less than a predetermined threshold value as a desired rank.

14 Claims, 8 Drawing Sheets

(51) Int. Cl.
*G06N 3/04* (2023.01)
*G06N 3/063* (2023.01)

(56) References Cited

U.S. PATENT DOCUMENTS

| | | | |
|---|---|---|---|
| 2016/0019455 | A1 | 1/2016 | Annapureddy et al. |
| 2016/0174902 | A1* | 6/2016 | Georgescu ........... G06V 10/454 600/408 |
| 2017/0168991 | A1* | 6/2017 | Baskaran ................ G06F 17/16 |
| 2018/0217217 | A1* | 8/2018 | Weingartner .......... G01R 33/50 |
| 2019/0228311 | A1* | 7/2019 | Sarah ....................... G06N 3/04 |

OTHER PUBLICATIONS

Xu et al., "Parallel Matrix Factorization for Low-Rank Tensor Completion," American Institute of Mathematical Sciences, Inverse Problems and Imaging, 2015, 25 pgs. (Year: 2015).*

Da Silva et al., "A Finite Algorithm to Compute Rank-1 Tensor Approximations," IEEE Signal Processing Letters, col. 23, No. 7, Jul. 2016, pp. 959-963. (Year: 2016).*

Dzlugatte et al., "Neural Network Matrix Factorization," ICLR 2016, 7 pgs. (Year: 2016).*

Tai et al., "Convolutional Neural Networks with Low-Rank Regularization," ICLR 2016, 11 pgs. (Year: 2016).*

Zhang et al., "Fast nonnegative tensor factorization based on accelerated proximal gradient and low-rank approximation," Neurocomputing 198, 2016, pp. 148-154. (Year: 2016).*

Dehghani et al, "Neural Ranking Models with Weak Supervision," SIGIR 2017, Aug. 7-11, 2017, pp. 65-74. (Year: 2017).*

Sidiropoulos, et al., "Tensor Decomposition for Signal Processing and Machine Learning," IEEE Transactions of Signal processing, vol. 65, No. 13, Jul. 1, 2017, pp. 3551-3582. (Year: 2017).*

International Search Report for PCT Application No. PCT/JP2018/039428, mailed on Jan. 15, 2019.

M. Jaderberg et al., "Speeding up convolutional neural networks with low rank expansions", British Machine Vision Conference, 2014, UK.

Yokota, Tatsuya et al., Smooth PARAFAC Decomposition for Tensor Completion, IEEE Transactions on Signal Processing vol. 64 No. 20, p. 5423-5436, [Online]Oct. 15, 2016, [retrieve Jan. 8, 2019], USA Internet: URL:https:/ieeexplore.ieee.org/stamp/stamp.jsp?arnumber=7502115 The chapter three, section 3.

* cited by examiner

NEURAL NETWORK RANK OPTIMIZATION DEVICE AND OPTIMIZATION METHOD

This application is a National Stage Entry of PCT/JP2018/039428 filed on Oct. 24, 2018, which claims priority from Japanese Patent Application 2018-012449 filed on Jan. 29, 2018, the contents of all of which are incorporated herein by reference, in their entirety.

TECHNICAL FIELD

The present invention relates to a rank optimization device and optimization method for speeding up the processing in a multi-layer neural network.

BACKGROUND ART

Deep learning is utilized in various information processing fields including image recognition. In the deep learning, multi-layer neural networks are used. A neural network is a mathematical model mimicking the neural network as a link of nerve cells (neurons) in a human brain. A multi-layer neural network includes an input layer, an output layer, and one or more hidden layers. The multi-layer neural network offers information processing of high accuracy.

A convolutional neural network has convolution layers as the hidden layers. A convolution layer applies filters (convolution filters) to input data to obtain feature maps. Many convolutional neural networks have pooling layers in addition to the convolution layers. A pooling layer extracts a representative value of an area in the feature map output from the convolution layer.

Figure 12:
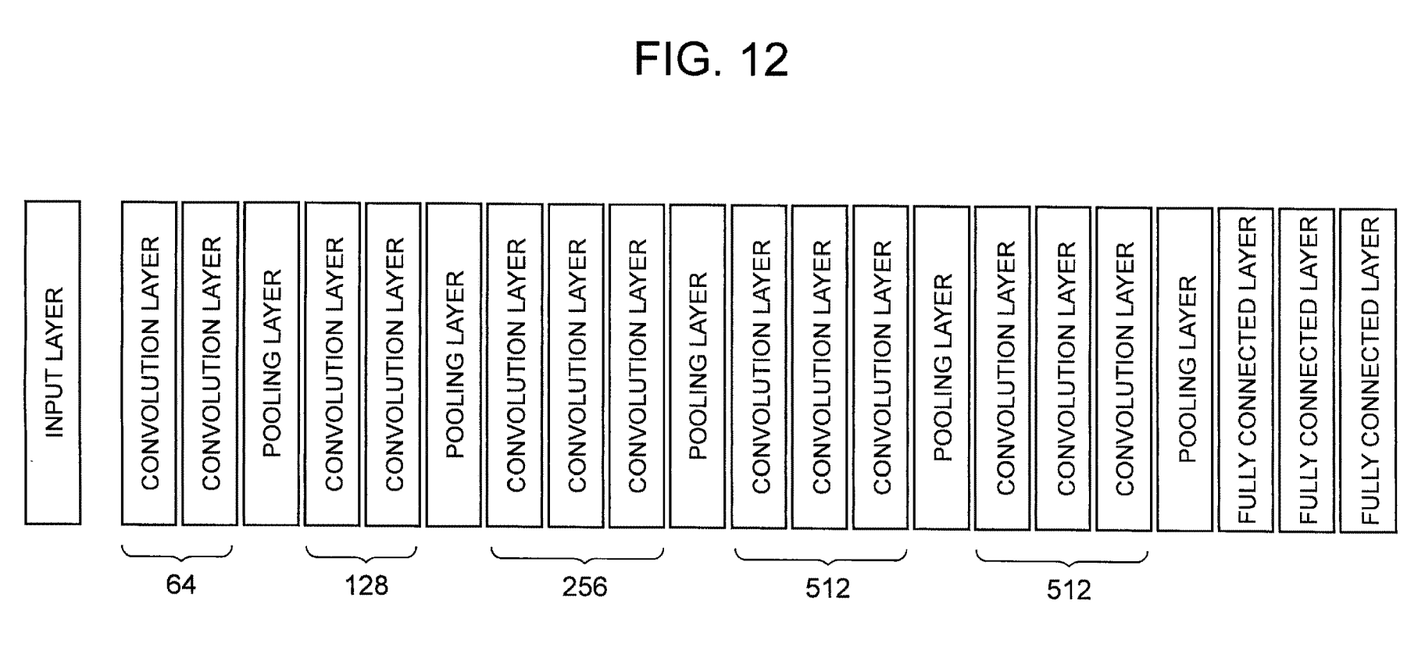
FIG. 12 It depicts a diagram illustrating a structure of an exemplary convolutional neural network.

FIG. 12 is a diagram illustrating a structure of VGG-16 as an example of the convolutional neural network. VGG-16 includes 13 convolution layers and three fully connected layers. The features extracted in the convolution layers, or in the convolution layers and the pooling layers, are classified in the fully connected layers. It should be noted that in FIG. 12, the number in the margin of the convolution layers indicates the number of convolution filters.

In a convolutional neural network, the calculation time for convolution operation constitutes most of the network processing time. That is to say, although the multi-layer convolutional neural network enables processing with high accuracy, it requires large computational complexity, so the processing speed is slow. Many methods for reducing the calculation time for the convolution operation (methods for speeding up the processing) have been proposed. One of such methods for speeding up the processing is a method of low rank approximation of a tensor of the convolution filter. Low rank approximation is a method of decomposing a tensor into a product of lower order tensors, to approximate the original tensor. There are several methods for the low rank approximation.

Tucker decomposition, for example, is used for the low rank approximation. A convolution filter in a convolutional neural network is generally expressed with a fourth order tensor. Rank 1 Tucker decomposition for the fourth order tensor $w_{ijkl}$ is expressed by, for example, the expression (1).

[Math. 1]

$$W_{ijkl} \approx \tilde{W}_{ijkl} = \sum_{r=1}^{R} W_{ijkr}^{1} W_{rl}^{2} \qquad (1)$$

In the expression (1), R is an approximate rank. Hereinafter, the approximate rank will be called the rank. In the expression (1), i, j, k, and l in $w_{ijkl}$ are indices for specifying the components of the tensor. The number of indices indicates the order of the tensor. $w^{1}_{ijkr}$ is a fourth order tensor. $w^{2}_{rl}$ is rank 2 tensor.

For evaluation of the approximation, a reconstruction error $E_{rec}$ as shown in the expression (2), for example, is used.

[Math. 2]

$$E_{rec} = \| \tilde{W} - W \|_{F} \qquad (2)$$

In the expression (2), $\|\cdot\|_{F}$ represents a Frobenius norm of the tensor. W represents the tensor before tensor decomposition (for example, Tucker decomposition) is applied to. W with a tilde represents the tensor after the tensor decomposition is applied to.

In the case of using the low rank approximation for a convolution filter, when the rank is lowered, the computational complexity is decreased, leading to a speedup of the processing. However, if the rank is made too low, the original convolution filter may not be reconducted, leading to an increased approximation error. Further, if the rank is made too low, the original convolution processing may not be reconducted with accuracy. Therefore, an appropriate rank should be selected for speeding up the processing while maintaining the processing accuracy.

Non Patent Literature (NPL) 1 discloses a method of applying low rank approximation to a multi-layer convolutional neural network. Specifically, the form of tensor decomposition and the tensor decomposition method based on a reconstruction error have been proposed. In NPL 1, for verification of the method, the results of experiment of low rank approximation performed for two convolution layers in a neural network including four convolution layers are shown. The experiment indicates that the processing is sped up while the processing accuracy is maintained.

CITATION LIST

Non Patent Literature

NPL 1: M. Jaderberg et al., "Speeding up convolutional neural networks with low rank expansions", British Machine Vision Conference, 2014

SUMMARY OF INVENTION

Technical Problem

As explained above, low rank approximation (tensor decomposition such as Tucker decomposition) is useful in speeding up the processing in a convolutional neural network. When tensor decomposition is performed, the rank is an important element.

However, in the case where high order tensors like convolution filters are used, the relationship between the rank and the approximation error is uncertain. In other words, a method for determining a rank (optimal rank) that can reduce the computational complexity while restricting the approximation error to within an allowable range is desired.

Further, a multi-layer convolutional neural network having more than ten convolution layers, as illustrated in FIG. 12, is often used. In the multi-layer convolutional neural network, in order to achieve a high speedup rate, low rank approximation is desirably performed on all the convolution layers simultaneously, for the following reasons.

The respective convolution layers perform processing on the input data sequentially. Further, there are correlations in terms of the output data between the convolution filters in the respective layers. Similarly, there are correlations in terms of the reconstruction errors in low rank approximation between the respective layers. Thus, in the case where low rank approximation is performed in a multi-layer convolutional neural network, the approximate ranks in the respective layers are desired to be optimized simultaneously.

However, the search space for optimization (the number of combinations of the ranks of the respective layers) increases exponentially with respect to the number of convolution layers as the targets of the approximate ranks. As a result, there is a problem that it requires a long time to apply low rank approximation at one time to all the convolution layers for a multi-layer convolutional neural network having more than ten layers.

It is an object of the present invention to provide a rank optimization device and optimization method capable of obtaining optimal ranks for all convolution layers in a multi-layer neural network in a short time.

Solution to Problem

A neural network rank optimization device according to the present invention is characterized by including: tensor decomposition means for performing tensor decomposition processing of tensor-decomposing a convolution filter included in a neural network for low rank approximation; and rank optimization means for optimizing a rank used in the tensor decomposition means, the rank optimization means including evaluation value calculation means for calculating an evaluation value representing the degree of the low rank approximation, and rank determination means for setting a rank corresponding to the evaluation value smaller than a predetermined threshold value to be a desired rank.

A neural network rank optimization method according to the present invention is characterized by: performing tensor decomposition processing of tensor-decomposing a convolution filter included in a neural network for low rank approximation; and performing rank optimization processing of optimizing a rank used in the tensor decomposition processing, and in the rank optimization processing, calculating an evaluation value representing the degree of the low rank approximation, and setting a rank corresponding to the evaluation value smaller than a predetermined threshold value to be a desired rank.

A neural network rank optimization program according to the present invention is characterized by causing a computer to perform: tensor decomposition processing of tensor-decomposing a convolution filter included in a neural network for low rank approximation; and rank optimization processing of optimizing a rank used in the tensor decomposition processing, and in the rank optimization processing, processing of calculating an evaluation value representing the degree of the low rank approximation, and processing of setting a rank corresponding to the evaluation value smaller than a predetermined threshold value to be a desired rank.

Advantageous Effects of Invention

The present invention is able to obtain, in a short time, optimal ranks for all convolution layers in a multi-layer neural network.

DESCRIPTION OF EMBODIMENT

Embodiments of the present invention will be described below with reference to the drawings.

Exemplary Embodiment 1

Figure 1:
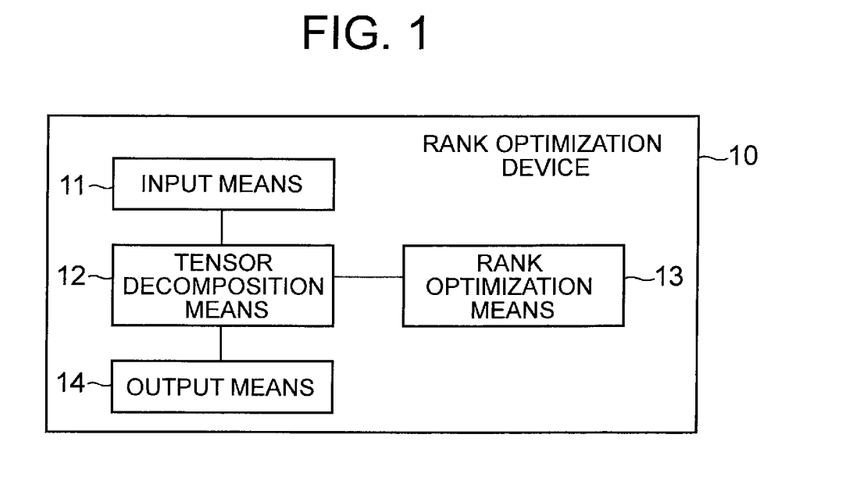
FIG. 1 It depicts a block diagram showing an exemplary configuration of a first exemplary embodiment of a neural network rank optimization device.

FIG. 1 is a block diagram showing an exemplary configuration of a first exemplary embodiment of a neural network rank optimization device. The rank optimization device 10 of the first exemplary embodiment includes input means 11, tensor decomposition means 12, rank optimization means 13, and output means 14.

The input means 11 inputs convolution filters (specifically, data representing the convolution filters) of a neural network.

The tensor decomposition means 12 inputs a convolution filter from the input means 11. The tensor decomposition means 12 also inputs a rank from the rank optimization means 13, and performs tensor decomposition processing on the convolution filter on the basis of the input rank.

Figure 2:
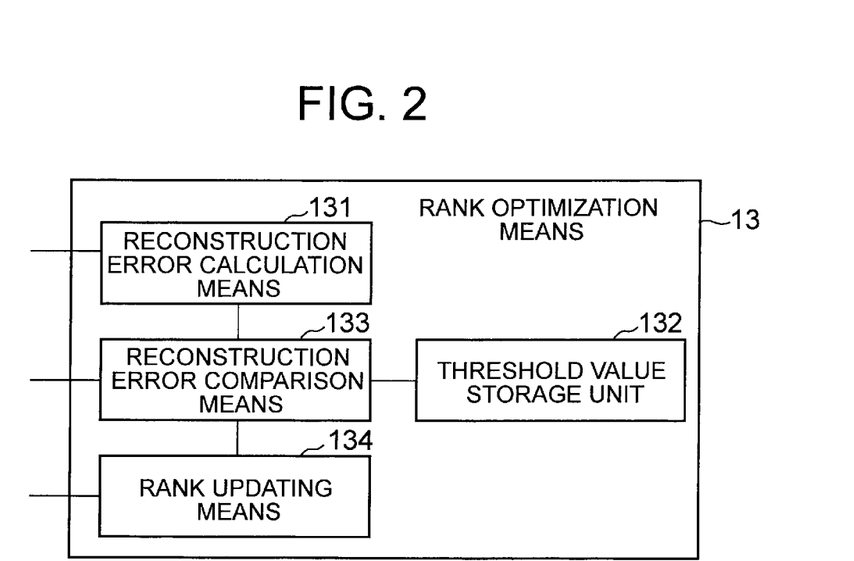
FIG. 2 It depicts a block diagram showing an exemplary configuration of rank optimization means in the first exemplary embodiment.

FIG. 2 is a block diagram showing an exemplary configuration of the rank optimization means 13. The rank optimization means 13 shown in FIG. 2 includes reconstruction error calculation means 131, a threshold value storage unit 132, reconstruction error comparison means 133, and rank updating means 134.

The reconstruction error calculation means 131 inputs convolution filters before and after the tensor decomposition from the tensor decomposition means 12, and calculates a reconstruction error rate.

The reconstruction error calculation means 131 calculates norm of a tensor (magnitude) for quantitative evaluation of the magnitude of the difference between the convolution filters before and after the tensor decomposition. The reconstruction error calculation means 131 uses a Frobenius norm, for example, as the norm of the tensor. However, the reconstruction error calculation means 131 may use a norm other than the Frobenius norm.

The threshold value storage unit 132 stores a threshold value concerning the reconstruction error. The reconstruction error comparison means 133 reads the threshold value from the threshold value storage unit 132. The threshold value stored in the threshold value storage unit 132 is registered in advance by a user. It should be noted that the magnitude of the threshold value is very small, for example on the order of error in numerical calculation.

The reconstruction error comparison means 133 inputs a reconstruction error from the reconstruction error calculation means 131. The reconstruction error comparison means 133 also inputs a threshold value from the threshold value storage unit 132. The reconstruction error comparison means 133 compares the reconstruction error with the threshold value.

The rank updating means 134 selects a rank from a set of ranks (a set of positive integers of not greater than the number of dimensions of the convolution filter), and outputs the selected rank to the tensor decomposition means 12. For example, the rank updating means 134 outputs rank 1 as the initial value. Thereafter, at each rank output timing, the rank updating means 134 outputs a value obtained by incrementing the rank output immediately before by 1, as the updated rank. While the rank updating means 134 may output ranks incremented by 1 sequentially, it may determine the rank to be output, by the Newton method, bisection method, or other optimization method.

The rank optimization means 13 with the configuration as illustrated in FIG. 2 is capable of retrieving the rank systematically by repeatedly performing comparing between the rank and threshold value and updating the rank. As a consequence, the rank optimization means 13 is able to output an optimal rank.

The output means 14 outputs the tensor-decomposed convolution filters (specifically, data representing the convolution filters).

Figure 3:
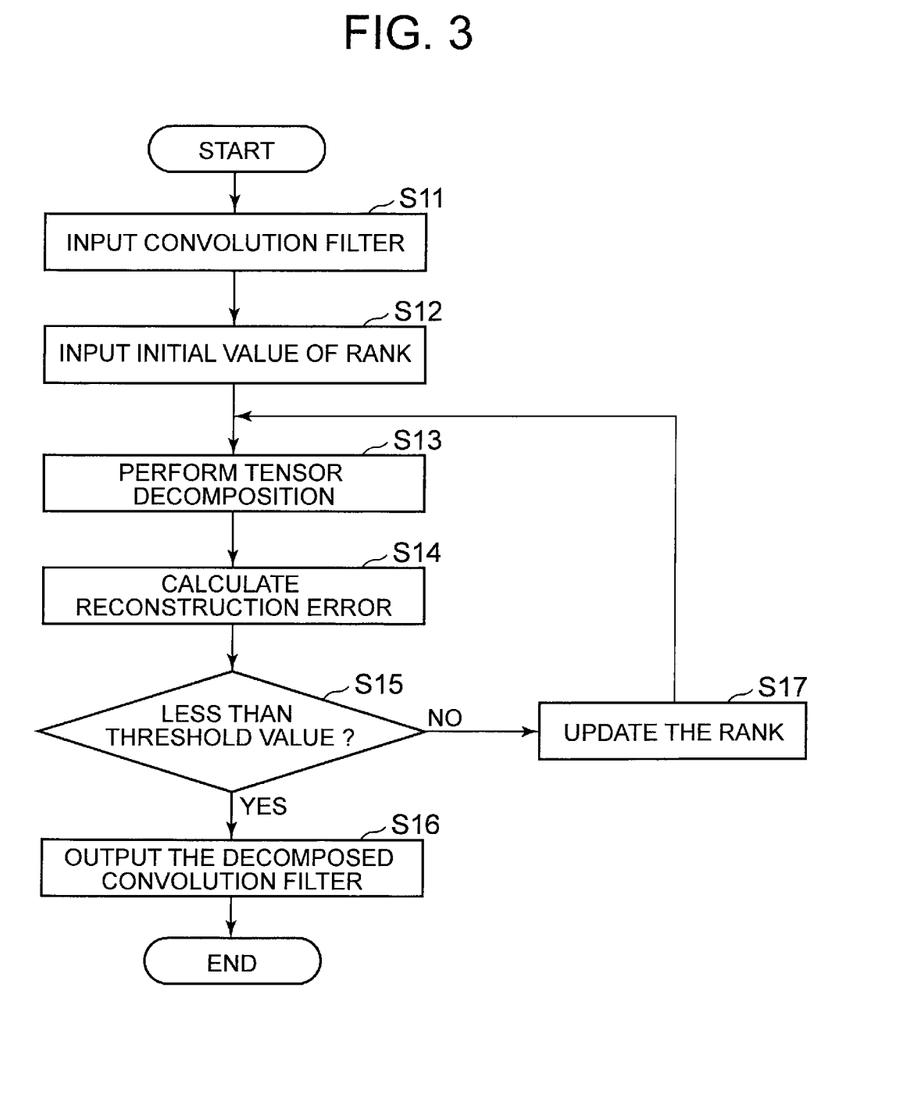
FIG. 3 It depicts a flowchart illustrating an operation of the rank optimization device of the first exemplary embodiment.

An operation of the rank optimization device 10 will now be described. FIG. 3 is a flowchart illustrating an operation of the rank optimization device 10 of the first exemplary embodiment.

While FIG. 3 illustrates processing for one convolution filter, in practice, the rank optimization device 10 receives all convolution filters in all layers. The rank optimization means 13 performs the optimization method illustrated in FIG. 3 on all the convolution filters.

The rank optimization device 10 may perform the processing in steps S12 to S16 each time one convolution filter is input to the input means 11. Alternatively, the rank optimization device 10 may perform the processing in steps S12 to S16 on each convolution filter when all the convolution filters are input to the input means 11. In this case, the input means 11 temporarily stores the input convolution filters.

When a convolution filter of a neural network is input to the input means 11 (step S11), the tensor decomposition means 12 inputs an initial value of the rank from the rank updating means 134 (step S12).

The tensor decomposition means 12 performs tensor decomposition processing on the convolution filter, on the basis of the rank as the processing target at that time point (step S13). Then, the tensor decomposition means 12 outputs the convolution filters before and after the decomposition, to the reconstruction error calculation means 131.

The reconstruction error calculation means 131 performs calculation of a reconstruction error on the basis of the convolution filters before and after the decomposition input from the tensor decomposition means 12 (step S14). The reconstruction error calculation means 131 outputs the calculated reconstruction error to the reconstruction error comparison means 133.

The reconstruction error comparison means 133 compares the magnitudes of the reconstruction error input from the reconstruction error calculation means 131 and the threshold value read from the threshold value storage unit 132. Specifically, the reconstruction error comparison means 133 determines whether the reconstruction error is less than the threshold value (step S15).

When the reconstruction error is less than the threshold value, the reconstruction error comparison means 133 outputs the decomposed convolution filter to the output means 14 (step S16).

It should be noted that the decomposed convolution filter, output in the processing in step S16, reflects the rank that has been the target of determination in the determination processing (comparison processing) in step S15. Therefore, it can be said that the reconstruction error comparison means 133 substantially outputs the determined optimal rank.

When the reconstruction error is not less than the threshold value, the rank updating means 134 performs updating the rank (step S17). The rank updating means 134 then outputs the updated rank to the tensor decomposition means 12. Thereafter, the processing in step S13 and on is performed again.

In the rank optimization device 10 of the present exemplary embodiment, the rank optimization means 13 has been configured to repeat the determination (see step S15) and the updating (see step S17) to determine the rank at which the reconstruction error becomes ignorable, automatically and independently of the other layers. This enables optimization of the rank at low cost (in a short time) even if there are a large number of convolution layers.

Exemplary Embodiment 2

Figure 4:
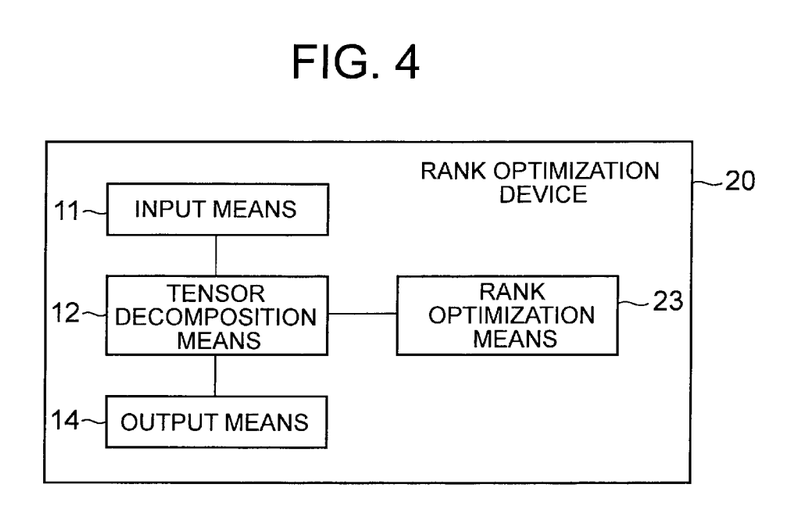
FIG. 4 It depicts a block diagram showing an exemplary configuration of a second exemplary embodiment of the neural network rank optimization device.

FIG. 4 is a block diagram showing an exemplary configuration of a second exemplary embodiment of the neural network rank optimization device. The rank optimization device 20 of the second exemplary embodiment includes input means 11, tensor decomposition means 12, rank optimization means 23, and output means 14.

The input means 11, the tensor decomposition means 12, and the output means 14 are identical to those in the first exemplary embodiment.

Figure 5:
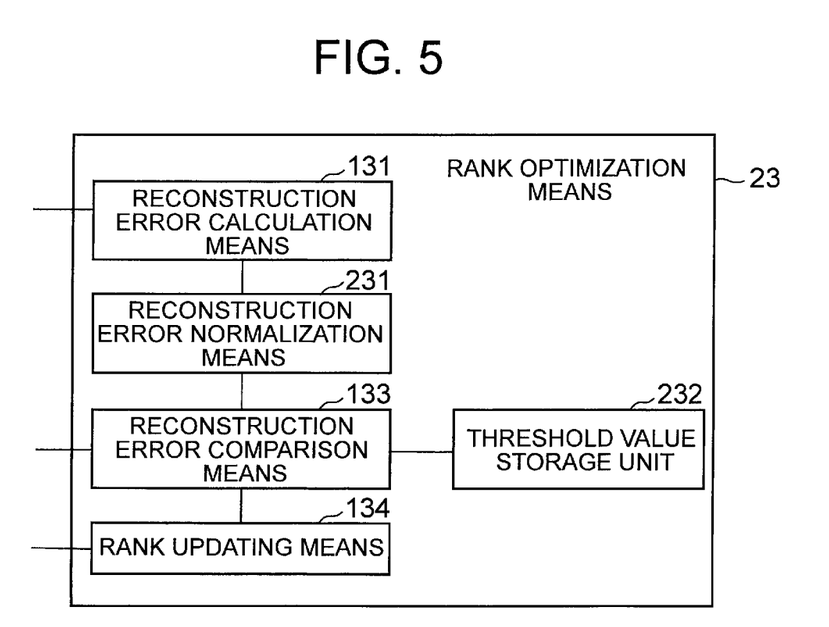
FIG. 5 It depicts a block diagram showing an exemplary configuration of the rank optimization means in the second exemplary embodiment.

FIG. 5 is a block diagram showing an exemplary configuration of the rank optimization means 23. The rank optimization means 23 shown in FIG. 5 includes reconstruction error calculation means 131, a threshold value storage unit 232, reconstruction error normalization means 231, reconstruction error comparison means 133, and rank updating means 134.

The reconstruction error normalization means 231 inputs a reconstruction error from the reconstruction error calculation means 131, and performs normalization processing to cause the upper limits of the reconstruction errors in the respective layers to be uniform.

Specifically, the reconstruction error normalization means 231 calculates a norm of the tensor of the convolution filter before decomposition as a normalization variable, and divides the reconstruction error by the normalization variable. The form of the norm of the tensor is, for example, the same as the one used by the reconstruction error calculation means 131. In any convolution layer, the upper limit of the reconstruction error becomes 1 (value of the reconstruction error at rank 0) by the normalization processing.

The threshold value storage unit 232 stores a threshold value concerning the reconstruction error. The reconstruction error comparison means 133 reads the threshold value from the threshold value storage unit 232. The threshold value stored in the threshold value storage unit 232 is registered in advance by a user. In the present exemplary embodiment, the threshold value storage unit 232 stores a threshold value that is a real number not smaller than 0 and not larger than 1.

The reconstruction error calculation means 131, the reconstruction error comparison means 133, and the rank updating means 134 are identical to those in the first exemplary embodiment. However, different from the case of the first exemplary embodiment, the rank updating means 134 inputs a normalized reconstruction error.

Figure 6:
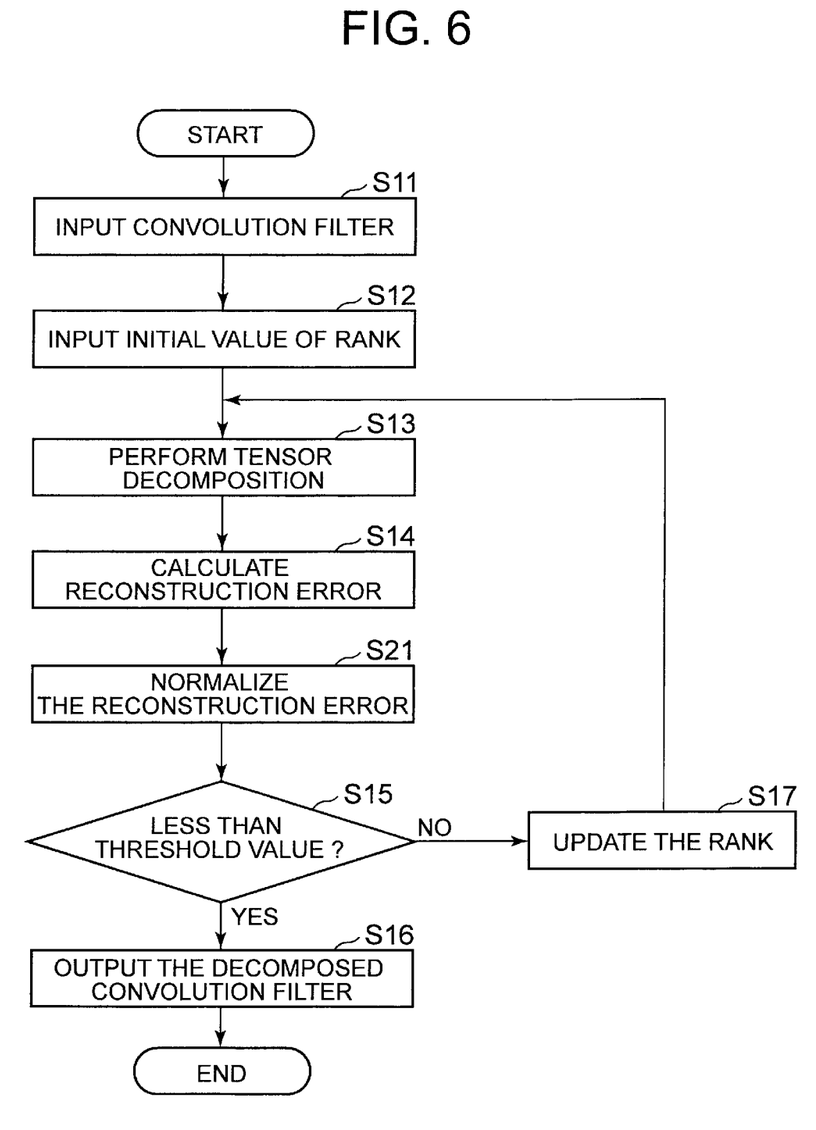
FIG. 6 It depicts a flowchart illustrating an operation of the rank optimization device of the second exemplary embodiment.

An operation of the rank optimization device 20 will now be described. FIG. 6 is a flowchart illustrating an operation of the rank optimization device 20 of the second exemplary embodiment.

While FIG. 6 illustrates processing for one convolution filter, in practice, the rank optimization device 20 receives all convolution filters in all layers. The rank optimization means 23 performs the optimization method illustrated in FIG. 6 on all the convolution filters.

The processing in steps S11 to S14 is identical to that in the first exemplary embodiment. However, the reconstruction error calculation means 131 outputs the calculated reconstruction error to the reconstruction error normalization means 231.

The reconstruction error normalization means 231 normalizes the reconstruction error input from the reconstruction error calculation means 131 (step S21). The reconstruction error normalization means 231 outputs the normalized reconstruction error to the reconstruction error comparison means 133.

The reconstruction error comparison means 133 compares the magnitudes of the normalized reconstruction error input from the reconstruction error normalization means 231 and the threshold value read from the threshold value storage unit 132. Specifically, the reconstruction error comparison means 133 determines whether the reconstruction error is less than the threshold value (step S15).

As in the case of the first exemplary embodiment, when the reconstruction error is less than the threshold value, the reconstruction error comparison means 133 outputs the decomposed convolution filter to the output means 14 (step S16).

When the reconstruction error is not less than the threshold value, the rank updating means 134 performs updating the rank (step S17). The rank updating means 134 then outputs the updated rank to the tensor decomposition means 12. Thereafter, the processing in step S13 and on is performed again.

As explained above, it is desirable to determine a rank that can reduce the computational complexity of the convolution operation while restricting the reconstruction error to within an allowable range. In the low rank approximation in the convolution layer, there is a tradeoff between the processing speed of the convolution operation and the reconstruction error. When giving higher priority to the processing speed while allowing a certain reconstruction error, setting of the threshold value for the reconstruction error corresponding to the allowable amount is important. Particularly in the case of a multi-layer convolutional neural network, the reconstruction errors in the respective layers are correlated with each other, making it difficult to set an appropriate threshold value for each layer. That is to say, it requires a long time to set an appropriate threshold value for a respective layer.

However, in the present exemplary embodiment, the reconstruction error normalization means 231 in the rank optimization means 23 is capable of obtaining an indicator of the approximation error independent of the value of the convolution filter and its filter size (corresponding to the dimension when the convolution filter is regarded as a tensor). As a result, it is only necessary to adjust a single threshold value, for a neural network having a large number of convolution layers, to optimize the ranks of the respective layers. The ranks can be optimized at low cost (in a short time) even if the number of convolution layers is large.

Further, even in the case where the low rank approximation is poor in accuracy (even in the case where the decomposed convolution filter has completely lost the original information), the reconstruction error normalization means 231 makes the upper limit of the reconstruction error to be 1 irrespective of the form of the tensor decomposition and of the magnitude of the rank, so the degree of approximation can be evaluated using the same threshold value for all the convolution layers. Therefore, the parameter to be searched is limited only to the threshold value. Accordingly, the ranks can be optimized at low cost (in a short time) even if the number of convolution layers is large.

In the first and second exemplary embodiments, the reconstruction error alone was used as the criterion for rank optimization. However, a criterion based on computational throughput may be used together. The computational throughput following the low rank approximation of each convolution layer can be calculated uniquely in the form depending on the rank of the low rank approximation, in accordance with the definition of the convolution operation. Therefore, the rank optimization means 13, 23 may, for example, accumulate the ranks that satisfy the criterion by comparison between the reconstruction error and the threshold value, and then output one of those ranks that minimizes the computational throughput as an optimal rank.

In this case, the reconstruction error comparison means 133 temporarily stores the rank corresponding to the reconstruction error determined to be under (that is, less than) the threshold value in the determination in step S15. Then, even if the determination result in step S15 is "Yes", the process proceeds to step S17. When the updated rank value has reached a predetermined value, the reconstruction error comparison means 133 retrieves a rank that minimizes the computational throughput from among the temporarily stored ranks. Then, the reconstruction error comparison means 133 outputs the thus found rank minimizing the computational throughput, as the optimal rank. Here, instead of the rank, the low-rank approximated convolution filter corresponding to the rank may be output.

In the case where the criterion based on the computational complexity is used together, the computational complexity for each layer in the multi-layer convolutional neural network is minimized, offering an additional effect of further increasing the processing speed of the neural network.

Further, while the above exemplary embodiments targeted the convolution layers in the multi-layer convolutional neural networks, the rank optimization methods of the above exemplary embodiments are also applicable to layers other than the convolution layers that use tensors for operations. For example, in the case of targeting fully connected layers which perform matrix vector product operations, low rank approximation may be performed on the matrix weight and the rank optimization method of each of the above exemplary embodiments may be applied. In this case, the tensor decomposition means 12 inputs weights of the matrix in the fully connected layer in the neural network.

Example

A specific example of the rank optimization device and rank optimization method will be described below with reference to FIGS. 4, 5, and 7.

Figure 7:
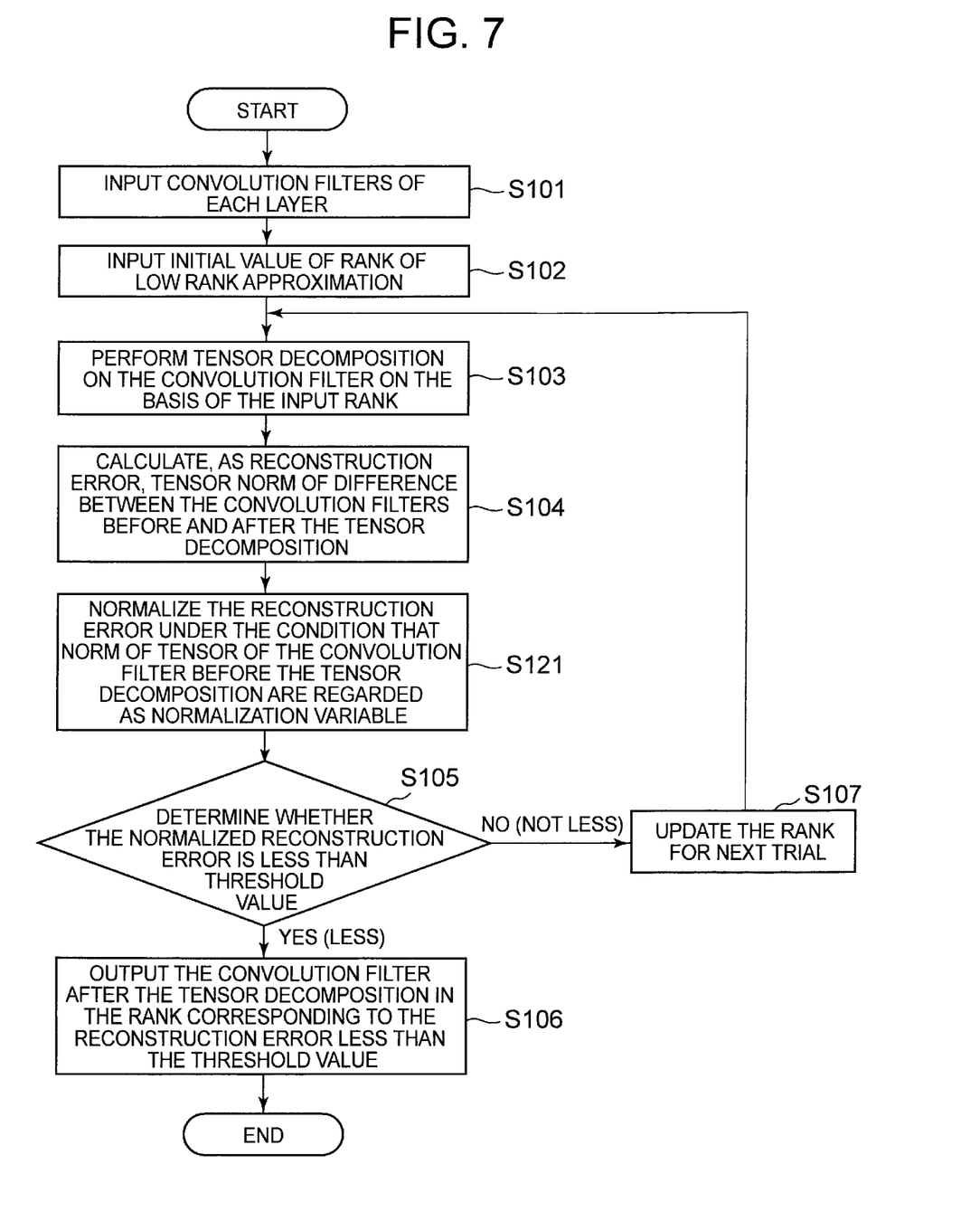
FIG. 7 It depicts a flowchart illustrating an operation of an example of the rank optimization device.

FIG. 7 is a flowchart illustrating a specific example of the rank optimization method. The processing illustrated in FIG. 7 corresponds to the rank optimization method of the second exemplary embodiment.

In the present example, the rank 1 Tucker decomposition defined by the expression (1) will be given as an example of the tensor decomposition.

The input means 11 receives each convolution filter W in a multi-layer convolutional neural network (step S101). The tensor decomposition means 12 inputs an initial value of a rank R for low rank approximation from the rank updating means 134 (step S102).

The tensor decomposition means 12 performs tensor decomposition processing on the convolution filter, on the basis of the input rank R, by using a numerical algorithm such as an iterative method (step S103). It should be noted that the tensor decomposition means 12 may perform the tensor decomposition using a method other than the iterative method. The tensor decomposition means 12 then outputs the convolution filters before and after the decomposition to the reconstruction error calculation means 131.

The reconstruction error calculation means 131 performs calculation of a reconstruction error on the basis of the convolution filters before and after the decomposition input from the tensor decomposition means 12 (step S104).

The reconstruction error is defined by a norm of a tensor that can express the magnitude of the tensor quantitatively. Specifically, the reconstruction error is defined by the norm of the tensor with respect to the difference between the convolution filters before and after the decomposition. In the present example, as the norm of the tensor, a Frobenius norm defined by the expression (3) is used. The Frobenius norm is by way of example; another norm may be used.

[Math. 3]

$$E_{rec}(\tilde{W},W)=\|\tilde{W}-W\|_F=\sqrt{\Sigma_{ijkl}(\tilde{W}_{ijkl}-W_{ijkl})^2} \quad (3)$$

The reconstruction error calculation means 131 outputs the calculated reconstruction error to the reconstruction error normalization means 231.

The reconstruction error normalization means 231, in receipt of the reconstruction error from the reconstruction error calculation means 131, performs normalization processing on the reconstruction error (step S121). The reconstruction error normalization means 231 then outputs the normalized reconstruction error to the reconstruction error comparison means 133.

The normalized reconstruction error ($E_{rec}$ with a circumflex) is calculated using the tensor norm N (W) of the convolution filter before the tensor decomposition as a normalization variable, by using the expression (4).

[Math. 4]

$$\hat{E}_{rec}(\tilde{W},W) = \frac{E_{rec}(\tilde{W},W)}{N(W)} \quad (4)$$

The form of the norm of the tensor N (W) is the same as the one used by the reconstruction error calculation means 131. As the reconstruction error calculation means 131 uses a Frobenius norm, the norm of the tensor N (W) is expressed as in the expression (5).

[Math. 5]

$$N(W)=\|W\|_F=\sqrt{\Sigma_{ijkl}W_{ijkl}^2} \quad (5)$$

The reconstruction error comparison means 133 determines whether the normalized reconstruction error input from the reconstruction error normalization means 231 is less than the threshold value read from the threshold value storage unit 232 (step S105).

When the normalized reconstruction error is less than the threshold value, the reconstruction error comparison means 133 outputs the decomposed convolution filter to the output means 14 (step S106). That is to say, the tensor-decomposed convolution filter in the rank corresponding to the reconstruction error that has fallen below the threshold value is output from the reconstruction error comparison means 133.

When the reconstruction error is not less than the threshold value, the rank updating means 134 performs updating the rank for a next trial (processing in steps S103, S104, S121, and S105) (step S107). The rank updating means 134 then outputs the updated rank to the tensor decomposition means 12. Thereafter, the processing in step S103 and on is performed again.

It should be noted that in the rank updating processing performed in step S107, the rank updating means 134 uses a method based on the iterative method. That is to say, the rank updating means 134 uses rank 1 as an initial value, and thereafter, updates the rank to a value incremented by 1 at each updating. However, the rank updating means 134 may use any method as long as it can thoroughly search for a rank that satisfies the threshold value. For example, the Newton method or other iterative method or bisection method may be used.

Further, in the present example, the rank 1 Tucker decomposition is used as the tensor decomposition. However, another form of decomposition may be used as the tensor decomposition. For example, in the case where the rank 2 Tucker decomposition is used, the convolution filter after the tensor decomposition may be expressed as in the expression (6). In the case where canonical polyadic (CP) decomposition is used, the convolution filter after the tensor decomposition may be expressed as in the expression (7).

[Math. 6]

$$\tilde{W}_{ijkl}=\Sigma_{r_3=1}^{R_3}\Sigma_{r_4=1}^{R_4}W_{kr_3}^{1}W_{ijr_3r_4}^{2}W_{r_4l}^{3} \quad (6)$$

[Math. 7]

$$\tilde{W}_{ijkl}=\Sigma_{r=1}^{R}W_{ir}^{1}W_{jr}^{2}W_{kr}^{3}W_{lr}^{4} \quad (7)$$

It should be noted that in the rank 2 Tucker decomposition, the optimized ranks are $R_3$ and $R_4$. In the CP decomposition, the optimized rank is R.

The components in the above exemplary embodiments may be configured with a piece of hardware or a piece of software. Alternatively, the components may be configured with a plurality of pieces of hardware or a plurality of pieces of software. Further, part of the components may be configured with hardware and the other part with software.

The functions (processing) in the above exemplary embodiments can be realized by a computer having a processor such as a central processing unit (CPU), a memory, etc. For example, a program for performing the method (processing) in the above exemplary embodiments may be stored in a storage device (storage medium), and the functions may be realized with the CPU executing the program stored in the storage device.

Figure 8:
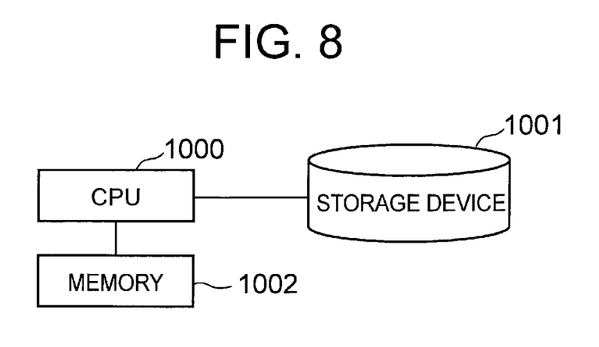
FIG. 8 It depicts a block diagram showing an example of a computer having a CPU.

FIG. 8 is a block diagram showing an example of a computer having a CPU. The computer is mounted on the rank optimization device. The computer may be a personal computer as an example. A graphics processing unit (GPU) may be implemented instead of the CPU, or both of the CPU and the GPU may be implemented.

The CPU 1000 executes processing in accordance with a program stored in a storage device 1001 to realize the functions in the above exemplary embodiments. That is to say, the functions of the tensor decomposition means 12 and the rank optimization means 13, 23 in the rank optimization device 10, 20 shown in FIGS. 1 and 4, and those of the reconstruction error calculation means 131, the reconstruction error comparison means 133, the rank updating means 134, and the reconstruction error normalization means 231 shown in FIGS. 2 and 4 are realized.

The storage device 1001 is, for example, a non-transitory computer readable medium. The non-transitory computer readable medium includes various types of tangible storage media. Specific examples of the non-transitory computer readable medium include magnetic storage media (for example, flexible disk, magnetic tape, hard disk), magneto-optical storage media (for example, magneto-optical disc), compact disc-read only memory (CD-ROM), compact disc-recordable (CD-R), compact disc-rewritable (CD-R/W), and semiconductor memories (for example, mask ROM, programmable ROM (PROM), erasable PROM (EPROM), flash ROM).

The storage device 1001 realizes the threshold value storage unit 132, 232.

Further, the program may be stored in various types of transitory computer readable media. The transitory computer readable medium is supplied with the program via, for example, a wired or wireless communication channel, or, via electric signals, optical signals, or electromagnetic waves.

A memory 1002 is storage means realized by a random access memory (RAM), for example, and temporarily stores data when the CPU 1000 executes processing. A conceivable mode is that the program held in the storage device 1001 or in a transitory computer readable medium is transferred to the memory 1002, and the CPU 1000 executes processing on the basis of the program in the memory 1002.

Figure 9:
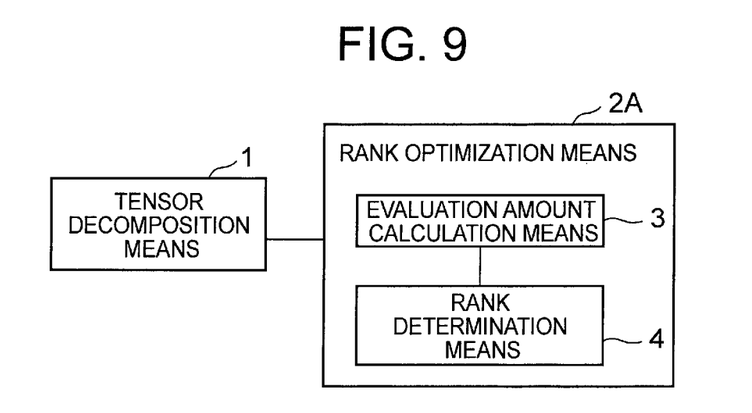
FIG. 9 It depicts a block diagram showing a main part of a rank optimization device.

FIG. 9 is a block diagram showing a main part of a rank optimization device. The rank optimization device shown in FIG. 9 includes: tensor decomposition means 1 (corresponding to the tensor decomposition means 12 in the exemplary embodiments) for performing tensor decomposition processing of tensor-decomposing a convolution filter included in a neural network for low rank approximation; and rank optimization means 2A (corresponding to the rank optimization means 13, 23 in the exemplary embodiments) for optimizing a rank used in the tensor decomposition means 1, wherein the rank optimization means 2A includes evaluation amount calculation means 3 (realized by the reconstruction error calculation means 131 in the exemplary embodiments) for calculating an evaluation amount (a reconstruction error in the exemplary embodiments) representing the degree of the low rank approximation, and rank determination means 4 (realized by the threshold value storage unit 132, 232 and the reconstruction error comparison means 133 in the exemplary embodiments) for setting a rank corresponding to the evaluation amount smaller than a predetermined threshold value to be a desired rank.

Figure 10:
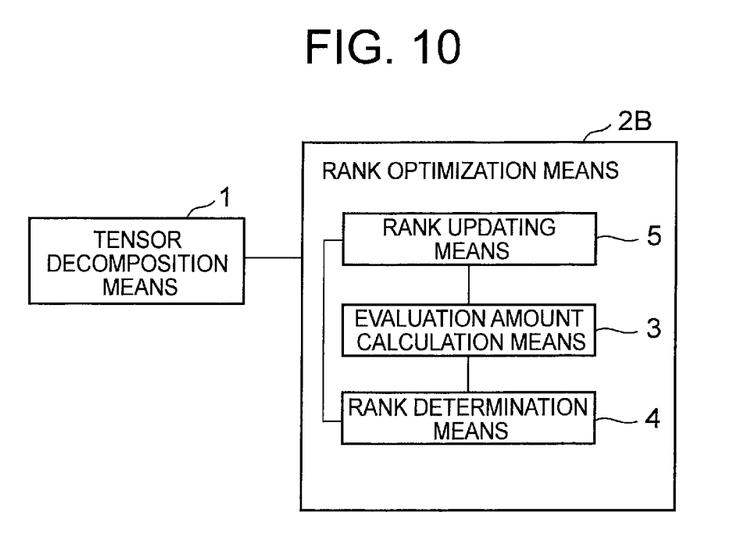
FIG. 10 It depicts a block diagram showing a main part of the rank optimization device of another mode.

FIG. 10 is a block diagram showing a main part of the rank optimization device of another mode. The rank optimization device shown in FIG. 10 is configured such that the rank optimization means 2B includes rank updating means 5 (corresponding to the rank updating means 134 in the exemplary embodiments) for performing rank updating processing of updating a rank, the tensor decomposition means 1 performs the tensor decomposition processing on the basis of the rank output by the rank updating means 5, the rank determination means 4 has a function of comparing the evaluation amount calculated by the evaluation amount calculation means 3 with the threshold value, and the rank updating processing and the tensor decomposition processing are repeated until the rank determination means 4 determines that the evaluation amount falls below the threshold value.

Figure 11:
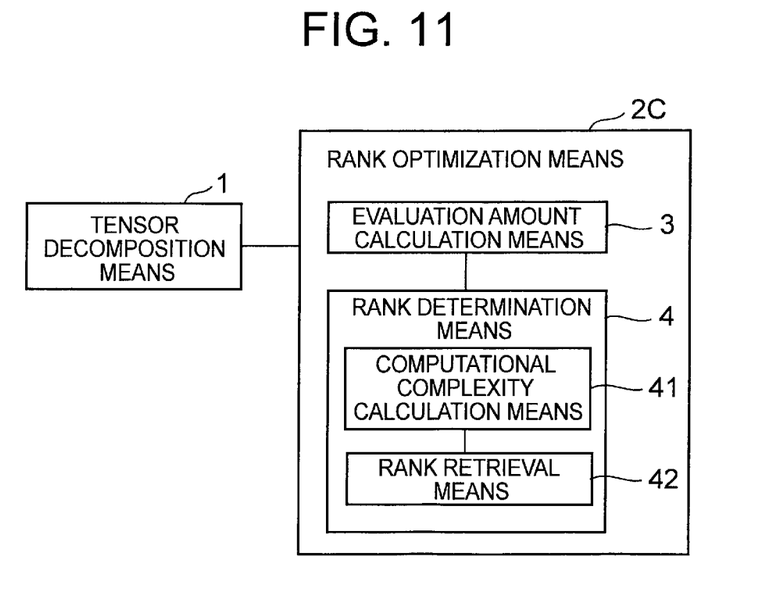
FIG. 11 It depicts a block diagram showing a main part of the rank optimization device of yet another mode.

FIG. 11 is a block diagram showing a main part of the rank optimization device of yet another mode. The rank optimization device shown in FIG. 11 is configured such that in the rank optimization means 2C, the rank determination means 4 includes computational complexity calculation means 41 for calculating computational complexity for convolution operation, and rank retrieval means 42 for retrieving a rank corresponding to a minimum amount of computation from among ranks corresponding to the evaluation amount smaller than the threshold value.

While the present invention has been described with reference to the exemplary embodiments, the present invention is not limited to the above exemplary embodiments. The configurations and details of the present invention can be subjected to various modifications appreciable by those skilled in the art within the scope of the present invention.

This application claims priority based on Japanese Patent Application No. 2018-012449 filed on Jan. 29, 2018, the disclosure of which is incorporated herein in its entirety.

REFERENCE SIGNS LIST 1 tensor decomposition means
2A, 2B, 2C rank optimization means
3 evaluation amount calculation means
4 rank determination means
5 rank updating means
10, 20 rank optimization device
11 input means
12 tensor decomposition means
13, 23 rank optimization means
14 output means
41 computation amount calculation means
42 rank retrieval means
131 reconstruction error calculation means
132 threshold value storage unit
133 reconstruction error comparison means
134 rank updating means
231 reconstruction error normalization means
1000 CPU
1001 storage device
1002 memory

What is claimed is:

1. A neural network rank optimization device comprising:
at least one memory configured to store instructions; and
at least one processor configured to execute the instructions to:
optimize a neural network having a plurality of convolution layers that each have a plurality of convolution filters, using low rank approximation, by:
for each convolution filter, iteratively:

updating a rank of the each convolution filter, such that in a first iteration the rank is set to an initial value;

performing tensor decomposition processing on the each convolution filter based on the rank of the each convolution filter;

calculating an evaluation amount representing a degree of the low rank approximation, by calculating a sum of differences between tensor components of the each convolution filter before and after the tensor decomposition processing, until the evaluation amount is less than a predetermined threshold value, such that the rank of the each convolution filter is optimized via tensor decomposition; and perform processing using the neural network as has been optimized, in which each convolution filter has been decomposed via the tensor decomposition processing based on the rank of the each convolution filter as updated in a last iteration.

2. The neural network rank optimization device according to claim 1, wherein, for each convolution filter, in a first iteration, the rank of the each convolution filter is updated to 1, and in every subsequent iteration, the rank of the each convolution filter is incremented by 1.

3. The neural network rank optimization device according to claim 2, wherein, for each convolution filter, the evaluation amount is a reconstruction error normalized by a norm of a tensor of the each convolution filter before the tensor decomposition processing is performed.

4. The neural network rank optimization device according to claim 2, wherein, for each convolution filter, the rank is updated by:

calculating computational complexity for a convolution operation of the each convolution filter, and retrieving a rank corresponding to minimum computational complexity from among a plurality of ranks corresponding to the evaluation amount less than the predetermined threshold value.

5. The neural network rank optimization device according to claim 2, wherein performing tensor decomposition processing includes inputting weights of a matrix in a fully connected layer of the neural network.

6. The neural network rank optimization device according to claim 1, wherein, for each convolution filter, the evaluation amount is a reconstruction error normalized by a norm of a tensor of the each convolution filter before the tensor decomposition processing is performed.

7. The neural network rank optimization device according to claim 6, wherein, for each convolution filter, the rank is updated by:

calculating computational complexity for a convolution operation of the each convolution filter, and retrieving a rank corresponding to minimum computational complexity from among a plurality of ranks corresponding to the evaluation amount less than the predetermined threshold value.

8. The neural network rank optimization device according to claim 6, wherein performing tensor decomposition processing includes inputting weights of a matrix in a fully connected layer of the neural network.

9. The neural network rank optimization device according to claim 1, wherein, for each convolution filter, the rank is updated by:

calculating computational complexity for a convolution operation of the each convolution filter, and retrieving a rank corresponding to minimum computational complexity from among a plurality of ranks corresponding to the evaluation amount less than the predetermined threshold value.

10. The neural network rank optimization device according to claim 9, wherein performing tensor decomposition processing includes inputting weights of a matrix in a fully connected layer of the neural network.

11. The neural network rank optimization device according to claim 1, wherein performing tensor decomposition processing includes inputting weights of a matrix in a fully connected layer of the neural network.

12. A computer-implemented neural network rank optimization method performed by a processor and comprising:

optimizing a neural network having a plurality of convolution layers that each have a plurality of convolution filters, using low rank approximation, by:

for each convolution filter, iteratively:

updating a rank of the each convolution filter, such that in a first iteration the rank is set to an initial value;

performing tensor decomposition processing on the each convolution filter based on the rank of the each convolution filter;

calculating an evaluation amount representing a degree of the low rank approximation, by calculating a sum of differences between tensor components of the each convolution filter before and after the tensor decomposition processing, until the evaluation amount is less than a predetermined threshold value, such that the rank of the each convolution filter is optimized via tensor decomposition; and performing processing using the neural network as has been optimized, in which each convolution filter has been decomposed via the tensor decomposition processing based on the rank of the each convolution filter as updated in a last iteration.

13. The computer-implemented neural network rank optimization method according to claim 12, wherein, for each convolution filter, in a first iteration, the rank of the each convolution filter is updated to 1, and in every subsequent iteration, the rank of the each convolution filter is incremented by 1.

14. A non-transitory computer readable information recording medium storing a neural network rank optimization program that, when executed by a processor, performs:

optimizing a neural network having a plurality of convolution layers that each have a plurality of convolution filters, using low rank approximation, by:

for each convolution filter, iteratively:

updating a rank of the each convolution filter, such that in a first iteration the rank is set to an initial value;

performing tensor decomposition processing on the each convolution filter based on the rank of the each convolution filter;

calculating an evaluation amount representing a degree of the low rank approximation, by calculating a sum of differences between tensor components of the each convolution filter before and after the tensor decomposition processing, until the evaluation amount is less than a predetermined threshold value, such that the rank of the each convolution filter is optimized via tensor decomposition; and performing processing using the neural network as has been optimized, in which each convolution filter has been decomposed via the tensor decomposition processing based on the rank of the each convolution filter as updated in a last iteration.

* * * * *